Aug. 31, 1965 A. F. FINELLI 3,203,913
CURED COMPOSITION PREPARED FROM MIXTURE OF POLYPROPYLENE
GLYCOL ETHER, DIISOCYANATE, AROMATIC
DIAMINE AND CELLULOSIC FILLER
Filed April 2, 1962
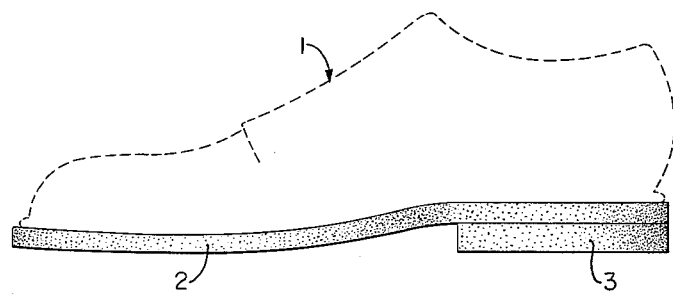
FIG. 1
FIG. 2
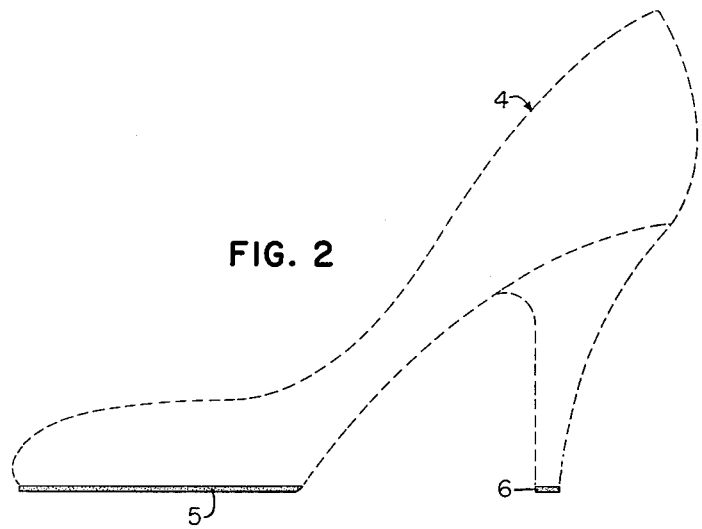
INVENTOR.
ANTHONY F. FINELLI
BY
J.B.Holden
ATTORNEY 3,203,913
CURED COMPOSITION PREPARED FROM MIXTURE OF POLYPROPYLENE GLYCOL ETHER, DIISOCYANATE, AROMATIC DIAMINE AND CELLULOSIC FILLER
Anthony F. Finelli, Akron, Ohio, assignor to The Goodyear Tire & Rubber Company, Akron, Ohio, a corporation of Ohio
Filed Apr. 2, 1962, Ser. No. 184,400
6 Claims. (Cl. 260—9)

This invention relates to polyurethane compositions and more particularly to those compositions which are useful in the wearing surfaces of shoes such as soles or heels.

It is the object of this invention to provide polyurethane compositions having the hardness, the outstanding wear resistance, the good nail holding properties and the resistance to chipping, spreading and splitting required for high quality shoe soles and heels and particularly required for top lifts for women's dress shoes. Other objects will appear as the description proceeds.

These objects are accomplished by employing, as the shoe wearing surfaces, polyurethane compositions containing certain polyether glycols, diisocyanates, reticulators and fillers as will be more fully set forth below.

The polyether glycols employed in preparing the shoe compositions of this invention are polypropylene ether glycols having an average molecular weight of from 800 to 1600, preferably 900 to 1500, and low unsaturation. These polypropylene ether glycols can contain as much as 10% ethylene groups. In fact, these polypropylene ether glycols capped with about 10% ethylene oxide to form a copolymer of propylene oxide and ethylene oxide can be used.

The diisocyanates employed to modify the polyether glycols to form the urethane compositions of this invention are diphenyl methane 4,4'-diisocyanate, the tolylene diisocyanates such as 2,4-tolylene diisocyanate, and 2,6-tolylene diisocyanate or mixtures of these tolylene diisocyanates.

Representative examples of the aromatic diamines useful as the reticulator in preparing the polyurethane compositions of this invention which may be employed are the chlorinated aromatic diamines such as methylene bis-ortho-chloro-aniline, isopropylidene bis ortho-chloro-aniline and ortho dichloro benzidine and 50/50 mixture of the foregoing chlorinated diamine with 4,4'-diamino diphenyl sulfone.

It has been found that the particular combinations of diisocyanate and reticulator indicated above are those which provide the required hardness and wear resistance to the polyurethane compositions. The amount of diisocyanate employed is from 1.7 to 2.5 mols per mol of polyether glycol and the amount of diamine used is sufficient to give a diamine to excess diisocyanate ratio of 0.5 to 1.0 where the excess diisocyanate is defined as the mols in excess of the mols of polypropylene ether glycol.

The fillers employed in preparing the polyurethane compositions are cellulosic powders or nut shell flours obtained by the grinding of such materials as walnut shells, pecan shells, cashew nut shells, peanut shells and various woods which still contain the lignin such as pine, spruce or fir with the harder woods such as oak, maple, walnut or elm being preferred. Of these cellulosic flours the relatively hard nut flours such as walnut shell flour and pecan shell flour are particularly preferred. The cellulosic flours have been found to produce in the cured urethane composition the desired wearing properties or abrasion resistance, the nail holding properties and the resistance to chipping, spreading and splitting which must be possessed by a shoe wearing surface of high quality.

It has been found that for best results the cellulosic flour should be finely ground to a size of at least 100 mesh and preferably 200 mesh. The amount of filler employed is from 60 to 100 parts by weight per 100 parts by weight of polyether glycol with the preferred amount being 75–85 parts by weight. Amounts of filler less than 60 parts by weight result in compositions having less desirable physical properties particularly with regard to the ability to hold nails employed in attaching the sole or heel to the shoe upper.

Smaller amounts of other fillers such as finely ground pumice stone or talc may be employed in combination with the cellulosic flour although it has been generally observed that the use of other fillers decreases the wear resistance of the composition. In this connection it should be appreciated that fillers having a low bulk density should not be employed since this type of filler tends to absorb the liquid polyester and prevent the satisfactory handling of the liquid reaction mixture.

First the liquid polypropylene ether glycol is placed in a 2-liter resin pot and heated at 90–115° C. under a vacuum for 30 minutes to remove the water present in the glycol. Then a small amount of magnesium oxide as a catalyst was added to the 2-liter pot. The diisocyanate and glycol is allowed to react for about 1 to 2 hours to form the prepolymer. The prepolymers formed by this technique are relatively fluid even at room temperature and thus permit cellulosic flours or nut flours to be added in as much as 60 to 100 parts per hundred parts of the polyether glycol and yet the mixture is still fluid or pourable. Hence, the prepolymers may be made in large quantities and stored. The cellulosic flours and crosslinking agents may be added to the prepolymer to cure and form the polyurethane composition of this invention. Not only do the polyether glycols offer this advantage over the polyesters but the compositions made by the prepolymer technique are preferred since a slight improvement in Shore hardness is obtained. This improvement in hardness is especially desirable with the polyether urethane composition as these compositions tend to have a lower Shore D hardness than the compositions obtained when using the polyesters.

After the cellulosic flour or nut flour has been added to the polyurethane prepolymer and uniformly mixed therein, the reticulator or crosslinking agent may be added. Since the use of amine type crosslinking agents are known to have relatively short pot lives, it has been found expedient to mix the amine reticulating agents with sufficient polyether glycol to form a slurry and then add the slurry to the prepolymer-cellulosic flour mixture. This technique increases the pot life of the mixture and permits larger batches to be poured without danger of the reaction mixture setting in the reaction pot. Once the reaction mixture has been cast into molds the material may be press cured for approximately 45 minutes at 290° F. and then post cured for approximately 16 hours at about 200–250° F. The cured composition may then be removed from the mold and shoe compositions such as heels, soles, etc. formed by cutting out the desired finished product with a suitable die.

In preparing the shoe wearing surfaces, it is possible either to pour the reaction mixture into molds designed in the shape of a shoe sole or a heel or it is possible to cast the composition in sheet form and die out the soles or heels desired from the cured sheet.

This invention is further illustrated with respect to the drawings in which;

FIG. 1 is a representation of a man's shoe 1, the sole 2 and/or heel 3 of which are made from the polyurethane composition. Another use for the polyurethane composition of this invention is as an insert or plug in a man's heel at those points where the wear is most severe, the balance of the heel being of a more conventional composition such as rubber or leather.

FIG. 2 is a representation of a woman's shoe 4, the sole 5 and/or top lift 6 of which are made from the urethane composition.

The practice of this invention is further illustrated with respect to the following examples which are representative rather than limitative of the scope of this invention. In these examples, unless otherwise specified, parts are shown by weight.

*Example I*

The following recipe was used in making the polyurethane composition of this example.

| | Parts |
|---|---|
| Polypropylene ether glycol, 1025 M.W. | 400 |
| Tolylene diisocyanate (80/20 isomers) | 133 |
| Magnesium oxide | 0.3 |
| Methylene bis-chloro-aniline | 91.5 |
| Pecan shell flour | 300 |

The polypropylene ether glycol was added to a 2-liter resin pot and magnesium oxide was added to the polyether at 100° C. After stirring under vacuum for 45 minutes @ 100° C. the tolylene diisocyanate was added and the stirring was continued for a period of about 3 hours while temperature was maintained at 70–100° C. The temperature of the tolylene diisocyanate-polyether mixture then was adjusted to 90° C. and the pecan shell flour was added. The pecan shell flour was stirred into the mixture until it became smooth. Then the crosslinking agent, methylene bis-chloroaniline was added and vigorously stirred therein. Within 30 seconds after the addition of the methylene bis-chloroaniline the mixture was poured into molds to obtain abrasion blocks, a tensile sheet and a sheet 6 x 6 x 3/16 inches. These samples were then heat cured for 20 hours at 210° F. These cured samples were used for tests and the following test data was obtained:

| | |
|---|---|
| Shore D durometer | 56 |
| Spread percent | 6.9 |
| Abrasion do | 121 |
| Nail pull test | Passes |

*Example II*

Example I was repeated except that walnut shell flour was used in place of the pecan flour and about 10 grams of the polypropylene ether glycol was mixed with the methylene bis-chloroaniline to form a dispersion prior to the addition of the methylene bis-chloroaniline to the prepolymer. Dispersion of the methylene bis-chloroaniline in part of the polypropylene glycol gave longer pot life and allowed the mixture to be poured into the molds more readily without appreciably affecting the physical properties of the cured product.

| | |
|---|---|
| Shore D durometer | 54 |
| Spread percent | 6.8 |
| Abrasion do | 122 |

*Example III*

In this example the mol ratio of polypropylene ether glycol to tolylene diisocyanate was 2 to 1. The prepolymer was formed by reacting the polypropylene ether glycol and tolylene diisocyanate at 95° C. for about two hours before adding the magnesium oxide (3/10 of a part). The walnut shell flour (300 parts) was added to the prepolymer and stirred until a smooth dispersion was obtained. Then 100 parts of methylene bis-chloroaniline was added to the mixture and stirred therein. Within 30 seconds after the addition of the methylene bis-chloroaniline, the mixture was cast into molds to form abrasion blocks, 2 sheets 6 x 6 x 3/16 and another sheet 4 x 4 x 1/2. These castings were press cured 60 minutes at 300° F. and then post cured 16 hours at 212° F. The post-cured product had the following physical properties:

| | |
|---|---|
| Shore D durometer | 58 |
| Spread percent | 6.2 |
| Abrasion do | 116 |
| Nail pull test | Passes |

*Example IV*

To 400 parts of polypropylene ether glycol (reactive number of 106.2) previously dried and treated with 0.3 part of magnesium oxide, 191 parts of 4,4'-diphenylmethane diisocyanate was added with stirring. After 70 minutes at temperatures of 97–103° C., walnut flour (300 parts) was added and stirred for 17 minutes. The 4,4'-methylene bis-(2-chloroaniline) was added in the molten state and after stirring some 30 seconds the melt was poured into molds. A sheet was press cured at 300° F. for 60 minutes and post cured at 100° C. for 18 hours. The cured sheet had the following physical properties:

| | |
|---|---|
| Shore D durometer | 55 |
| Spread percent | 6.9 |
| Abrasion do | 117 |

*Example V*

The polypropylene ether glycol (reactive number of 106.2), 400 parts, was treated with 0.3 part of magnesium oxide and stirred under vacuum at 100° C. for 45 minutes in a resin pot. Then tolylene diisocyanate, mixed isomers, 149 parts, was added. This mixture was allowed to react for 90 minutes at 87–100° C. Dry walnut flour (300 parts) was added and after stirring for 10 minutes a mix of 115 parts of 4,4'-methylene bis-(2-chloroaniline) and 12 parts of the polypropylene ether glycol was added. The mix was stirred well for 30 seconds and then poured into molds. Sheets 6 x 6 x 3/16 were press cured at 300° F. for 90 minutes and removed hot. The samples were post cured at 100° C. for 20 hours. The physical properties of the cured sheet were as follows:

| | |
|---|---|
| Shore D durometer | 61 |
| Spread percent | 9.9 |
| Abrasion do | 134 |
| Nail pull test | Passes |

A commercial polypropylene ether glycol capped with ethylene oxide to give a copolymer of propylene ether and ethylene ether glycols containing no more than 10 mol percent of ethylene ether groups may be used to replace the polypropylene ether glycol of this example to yield a polyurethane composition suitable for shoe soles and heels.

In the above examples the spread properties are expressed in terms of the percent loss in thickness of a 3/16-inch thick sample, 1/2 inch in diameter which is first conditioned at 110° F. for 30 minutes, then subjected at 110° F. to a pressure of 2000 pounds for 30 minutes and then released to stand at room temperature for 30 minutes before the reduced thickness is measured. Abrasion tests were conducted in accordance with the Bureau of Standard Abrasion (A.S.T.M. D–394–47–Method B). The nail pull properties were determined by attaching a portion of the cured material in the form of a woman's top lift to an oak block with a 3/16 inch protrusion between the top lift and the oak block, the attachment being provided through 3 nails in the form of wire conventionally employed in attaching top lifts to the heel base. The protruding heel edge, then, was subjected to maximum thumb pressure. If the heel cannot be pushed off with thumb the nail holding power is considered satisfactory.

The very low spread properties evidenced by the results shown in the examples above make the polyurethane compositions of this invention outstandingly useful in shoe soles and heels and particularly in women's top lifts where the weight of the wearer is distributed over an extremely small cross section. The outstanding abrasion results are evidence of the long wearing properties of the polyurethane compositions while the satisfactory nail holding properties permits the simple attachment of a shoe element such as a top life through the use of 3 nails and without requiring the use of adhesives, all of which adds to the ease of fabrication of the shoe.

In addition to the specific cellulosic flours, the specific reticulators and the specific operating conditions reported in the examples above, other cellulosic flours and other diamines listed as useful in this invention may be employed to prepare the compositions of this invention and to achieve the outstanding properties in the urethane compositions so long as the limitations more specifically set forth above are followed.

While certain representative embodiments and details have been shown for the purpose of illustrating the invention, it will be apparent to those skilled in this art that various changes and modifications may be made therein without departing from the spirit or scope of the invention.

What is claimed is:

1. A cured polyurethane composition suitable for the wearing surface of a shoe resulting from the reaction of a fluid mixture comprising
   (1) a polypropylene ether glycol containing less than 10 mole percent of ethylene ether group and having a molecular weight of 800 to 1600;
   (2) an organo diisocyanate selected from the class consisting of diphenyl methane-4,4'-diisocyanate and the tolylene diisocyanates;
   (3) a chlorinated aromatic diamine;
   (4) a cellulosic flour selected from the class consisting of wood flours and nut shell flours;
   (5) said diamine to excess diisocyanate ratio being from 0.5 to 1.0;
   (6) said diisocyanate being present in 1.7 to 2.5 mols per mol of polypropylene ether glycol; and
   (7) said cellulosic flours being present in an amount ranging from 60 to 100 parts by weight per hundred parts of polypropylene ether glycol and being characterized by the ability to form a pourable mixture when mixed with said polypropylene ether glycol in the above amounts.

2. The composition of claim 1 wherein the diamine is methylene bis-chloroaniline.

3. The composition of claim 1 wherein the diamine is ortho-dichloro-benzidine.

4. A cured polyurethane composition suitable for the wearing surface of a shoe resulting from the reaction of a fluid mixture comprising
   (1) a polypropylene ether glycol having a molecular weight of 800 to 1600;
   (2) an organo diisocyanate selected from the class consisting of diphenyl methane-4,4'-diisocyanate and the tolylene diisocyanates;
   (3) a chlorinated aromatic diamine;
   (4) a cellulosic flour selected from the class consisting of wood flours and nut shell flours;
   (5) said diamine to excess diisocyanate ratio being from 0.5 to 1.0;
   (6) said diisocyanate being present in 1.7 to 2.5 mols per mol of polypropylene ether glycol; and
   (7) said cellulosic flours being present in an amount ranging from 60 to 100 parts by weight per hundred parts of polypropylene ether glycol and being characterized by the ability to form a pourable mixture when mixed with said polypropylene ether glycol in the above amounts.

5. The composition of claim 4 wherein the diamine is methylene bis-chloroaniline.

6. The composition of claim 4 wherein the diamine is ortho-dichloro-benzidine.

References Cited by the Examiner
UNITED STATES PATENTS

| | | | |
|---|---|---|---|
| 2,968,575 | 1/61 | Mallonee | 260—37 |
| 2,983,702 | 5/61 | Little et al. | 260—9 |
| 3,022,257 | 2/62 | Gates et al. | 260—9 |

JOSEPH L. SCHOFER, *Primary Examiner.*

LEON J. BERCOVITZ, *Examiner.*